United States Patent
Drobnik et al.

(10) Patent No.: US 12,140,601 B2
(45) Date of Patent: Nov. 12, 2024

(54) CALIBRATION MANAGEMENT OF AN IN-VITRO DIAGNOSTIC SYSTEM

(71) Applicant: Roche Diagnostics Operations, Inc., Indianapolis, IN (US)

(72) Inventors: Juliane Drobnik, Zurich (CH); Mirko Klingauf, Schlieren (CH); Regula Krieg, Immensee (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 614 days.

(21) Appl. No.: 16/714,865

(22) Filed: Dec. 16, 2019

(65) Prior Publication Data

US 2020/0191811 A1    Jun. 18, 2020

(30) Foreign Application Priority Data

Dec. 18, 2018    (EP) .................................. 18213587

(51) Int. Cl.
*G01N 35/00*    (2006.01)
*G01N 35/04*    (2006.01)

(52) U.S. Cl.
CPC ................. *G01N 35/00693* (2013.01); *G01N 35/00623* (2013.01); *G01N 35/04* (2013.01);
(Continued)

(58) Field of Classification Search
CPC ......... G01N 35/00693; G01N 35/0623; G01N 35/04; G01N 2035/00673; G01N 2035/00702; G01N 2035/0443
See application file for complete search history.

(56) References Cited

U.S. PATENT DOCUMENTS

| | | |
|---|---|---|
| 8,071,029 B2 | 12/2011 | Wakamiya et al. |
| 8,231,830 B2 | 7/2012 | Wakamiya et al. |
| 8,916,095 B2 | 12/2014 | Shibuya et al. |
| 9,500,662 B2 | 11/2016 | Ariyoshi |

(Continued)

FOREIGN PATENT DOCUMENTS

| | | |
|---|---|---|
| CN | 108932969 A | 12/2018 |
| CN | 106053864 A | 1/2019 |

(Continued)

OTHER PUBLICATIONS

European Search Report issued Jun. 21, 2019, in Application No. EP 18213587.1, 2 pp.

(Continued)

*Primary Examiner* — P. Kathryn Wright
(74) *Attorney, Agent, or Firm* — Taft Stettinius & Hollister LLP

(57) ABSTRACT

A computer-implemented method of automatically managing calibration of an in-vitro diagnostic system is provided comprising determining a lot calibration time period in which a lot calibration is applicable to reagent containers of the same lot, having a predefined time length starting from the time when the lot calibration becomes available, upon making a reagent container of the lot available to the system, determining whether a lot calibration that has not exceeded the lot calibration time period is available and linking the reagent container to the available lot calibration or most recent available lot calibration if more than one lot calibration is available, wherein if a new lot calibration for the same lot becomes available the method comprises replacing the existing link to the previous lot calibration with a link to the new lot calibration.

16 Claims, 10 Drawing Sheets

(52) U.S. Cl.
CPC .............. *G01N 2035/00673* (2013.01); *G01N 2035/00702* (2013.01); *G01N 2035/0443* (2013.01)

(56) References Cited

U.S. PATENT DOCUMENTS

| | | | |
|---|---|---|---|
| 10,895,580 B2 | 1/2021 | Maetzler et al. | |
| 2005/0013736 A1 | 1/2005 | McKeever | |
| 2009/0177427 A1* | 7/2009 | Bauer | G16H 10/40 |
| | | | 702/85 |
| 2009/0269242 A1 | 10/2009 | Nozawa | |
| 2009/0292494 A1* | 11/2009 | Imai | G01N 35/00693 |
| | | | 702/85 |
| 2016/0299164 A1* | 10/2016 | Ackermann | G01N 35/00693 |

FOREIGN PATENT DOCUMENTS

| | | | |
|---|---|---|---|
| EP | 1975623 | A2 | 10/2008 |
| EP | 2116850 | A1 | 11/2009 |
| EP | 2843418 | A1 | 3/2015 |
| EP | 3078972 | A1 | 10/2016 |
| EP | 3267202 | A1 | 1/2018 |
| JP | 2008-170191 | A | 7/2008 |
| JP | 2012-108010 | A | 6/2012 |
| WO | 2008084601 | A1 | 7/2008 |
| WO | 2010120951 | A1 | 10/2010 |
| WO | 2013020045 | A2 | 2/2013 |
| WO | 2014110282 | A1 | 7/2014 |
| WO | 2016/140017 | A1 | 9/2016 |

OTHER PUBLICATIONS

Office Action; Chinese Patent Office; Chinese Application No. 201911301291.7; Mar. 29, 2023; 6 pages.

Search Report; Chinese Patent Office; Chinese Application No. 201911301291.7; Mar. 23, 2023; 4 pages.

Search Report, China Patent Office, Chinese Patent Application No. 201911301291.7, Aug. 4, 2023, 2 pages.

* cited by examiner

CALIBRATION MANAGEMENT OF AN IN-VITRO DIAGNOSTIC SYSTEM

CROSS-REFERENCE TO RELATED APPLICATIONS

This application claims priority to European Patent Application No. 18213587.1, filed 18 Dec. 2018, the disclosure of which is hereby incorporated by reference in its entirety.

FIELD OF THE DISCLOSURE

The present disclosure relates to a computer-implemented method of automatically managing calibration of an in-vitro diagnostic system and to an in-vitro diagnostic system performing operations associated with the method of automatically managing calibration.

BACKGROUND

In medicine, doctor's diagnosis and patient treatment often relies on the measurement of the concentration of analytes or other parameters in a patient sample. This measurement is typically carried out by in-vitro diagnostic systems that can be configured to analyze certain types of samples and detect certain types of analytes using various detecting technologies. As the life of patients may depend on the precision and the reliability of such measurements, it is important that the systems perform correctly.

It is a general requirement for in-vitro diagnostic systems to implement a set of Quality Control (QC) procedures in order to check that they continue operating correctly.

One of these procedures is calibration. In most cases, calibration is performed using standard solutions, with known concentrations. In this way, it is possible to correlate a measured signal to a quantitative result. Calibration should be performed more or less frequently depending on the system and other variable factors that may affect performance. One of these factors is aging of reagents, leading to expiration of reagents a predetermined time after reagent containers have been opened for the first time.

The effective throughput and usability as well as the costs of running of an in-vitro diagnostic system may be affected by the fact that a significant time may have to be dedicated to the execution and repetition of calibration procedures. Also, delays may occur due to missing or expired calibration. This applies even more to those in-vitro diagnostic systems that are configured to process different samples and test for different analytes in a random sequence and where different reagents according to the type of sample and/or to the analytes of interest are used, meaning that a calibration procedure for each of such sample/analyte/reagent combinations may be required and possibly on a varying frequency. An additional degree of complexity is given by the fact that different reagents may expire earlier than others. Thus there is a time limit for the validity of a calibration and a time period within which a reagent container may be used with reference to a particular calibration. Moreover, whereas for some reagents it is possible to refer to a single lot calibration applicable to reagent containers of the same lot at least within a predefined time period, for other reagents in general or under particular conditions only reagent container specific calibrations are possible, meaning that in order to use a particular reagent container, a calibration with that same reagent container has to be first carried out, released and activated, requiring typically manual intervention.

Thus, another problem is that for a user, managing the calibration process, including keeping track of available calibrations and expired calibrations, executing and assigning new calibrations, for each reagent container or analyte/reagent combination can be cumbersome, confusing and time-consuming, possibly leading to further delays and eventually to the execution of unnecessary calibrations with additional loss of efficiency and increased costs.

SUMMARY

It is against the above background that the present disclosure provides certain unobvious advantages and advancements over the prior art. In particular, the inventors have recognized a need for improvements in calibration management of in-vitro diagnostic systems.

Although the embodiments of the present disclosure are not limited to specific advantages or functionality, it is noted that the present disclosure provides a computer-implemented method of automatically managing calibration of an in-vitro diagnostic system and an in-vitro diagnostic system comprising a calibration management system running a computer-readable program provided with instructions to perform operations associated with the method of managing calibration that enables to minimize user intervention, to minimize the number of calibration procedures and the time spent for calibration procedures, to minimize delays of routine operation due to missing or expired calibration, while enabling optimal use of reagents before their expiration, therefore saving also costs and preventing waste of often expensive materials.

According to an embodiment of the present disclosure, a computer-implemented method of automatically managing calibration of an in-vitro diagnostic system is provided comprising determining a lot calibration time period, in which a lot calibration is applicable to reagent containers of the same lot, having a predefined time length starting from the time when the lot calibration becomes available and, upon making a reagent container of the lot available to the in-vitro diagnostic system, determining whether a lot calibration that has not exceeded the lot calibration time period is available and linking the reagent container to the available lot calibration or most recent available lot calibration if more than one lot calibration is available. If a new lot calibration for the same lot becomes available, the method further comprises replacing the existing link to the previous lot calibration with a link to the new lot calibration.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
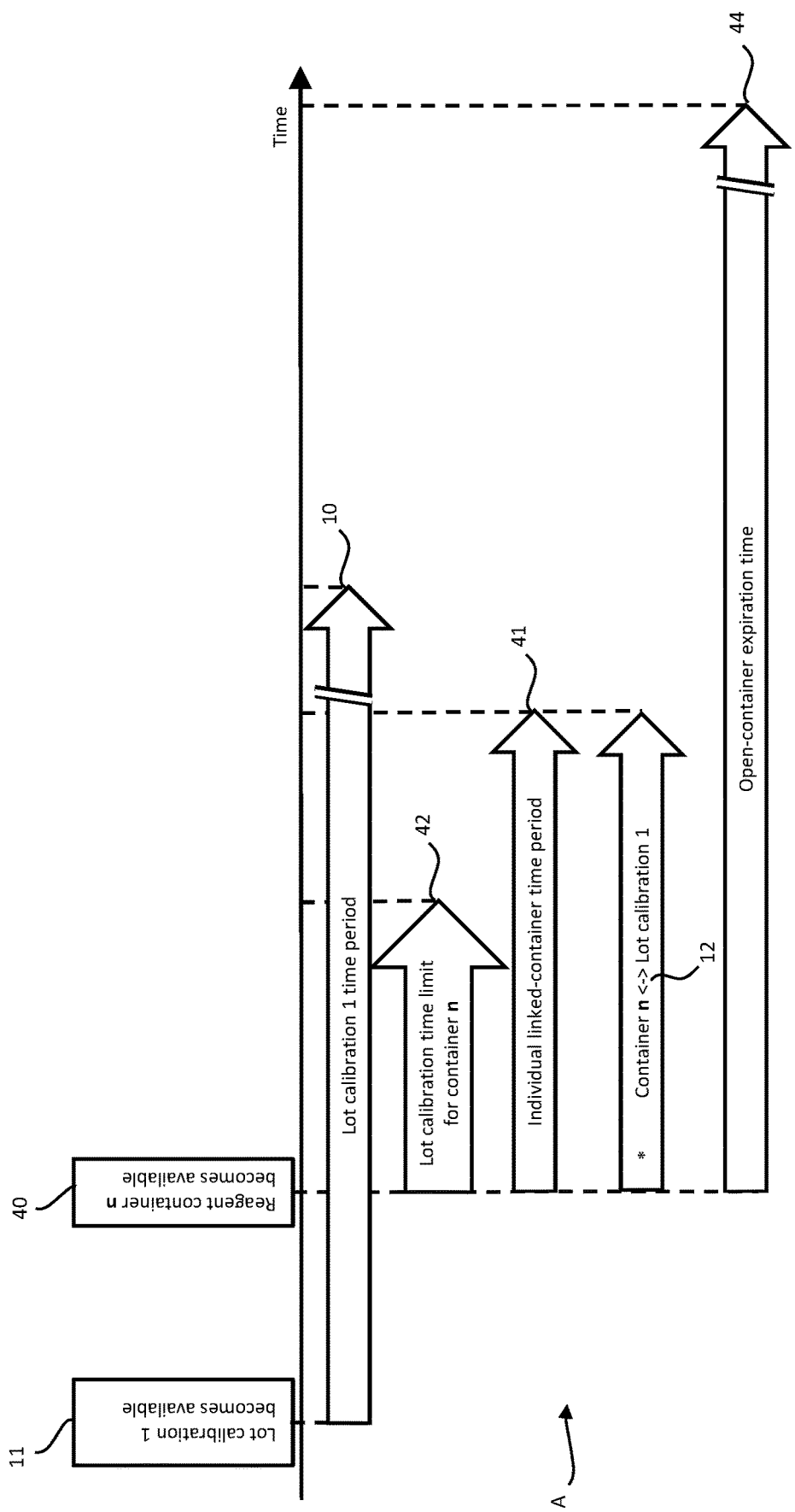
FIG. 1 schematically depicts first aspects of a computer-implemented method A in accordance with an embodiment of the present disclosure of automatically managing calibration of an in-vitro diagnostic system.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

An "in-vitro diagnostics system" is a laboratory automated apparatus dedicated to the analysis of samples for in vitro diagnostics. The in-vitro diagnostics system may have different configurations according to the need and/or according to the desired laboratory workflow. Additional configurations may be obtained by coupling a plurality of apparatuses and/or modules together. A "module" is a work cell, typically smaller in size than the entire in-vitro diagnostics system, which has a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps. Thus the in-vitro diagnostics system may comprise one analytical apparatus or a combination of any of such analytical apparatuses with respective workflows, where pre-analytical and/or post analytical modules may be coupled to individual analytical apparatuses or be shared by a plurality of analytical apparatuses. In the alternative, pre-analytical and/or post-analytical functions may be performed by units integrated into an analytical apparatus. The in-vitro diagnostics system can comprise functional units such as liquid handling units for pipetting and/or pumping and/or mixing of samples and/or reagents and/or system fluids, and also functional units for sorting, storing, transporting, identifying, separating, and/or detecting, with no intention of limiting the present disclosure to any particular in-vitro diagnostic system. Examples of in-vitro diagnostic systems can include clinical chemistry analyzers, immunochemistry analyzers, coagulation analyzers, hematology analyzers, and molecular diagnostic analyzers. The list is not exhaustive.

The term "sample" refers to a biological material suspected of containing one or more analytes of interest and whose detection, qualitative and/or quantitative, may be associated to a clinical condition. The sample can be derived from any biological source, such as a physiological fluid, including blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma or serum from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest. Samples may be provided for example in sample containers such as sample tubes, including primary tubes and secondary tubes, or multi-well plates, or any other sample carrying support, open or closed.

A "reagent" is a substance used for treatment of a sample or of a calibrator in order to, e.g., prepare a sample for analysis or a calibrator for measurement, in order to enable a reaction to occur, or to enable detection of a physical parameter of the sample, calibrator or analyte contained in the sample or calibrator. In particular, a reagent can be a substance that is or comprises a reactant, typically a compound or agent capable of, e.g., binding to or chemically transforming one or more analytes or an unwanted matrix component. Examples of reactants are enzymes, enzyme substrates, conjugated dyes, protein-binding molecules, ligands, nucleic acid binding molecules, antibodies, chelating agents, promoters, inhibitors, epitopes, antigens, and the like. However, the term reagent is used to include any fluid that can be added to a sample or calibrator including a dilution liquid, including water or other solvent or a buffer solution, or a substance that is used for disruption of specific or nonspecific binding of an analyte to a protein, binding proteins or surfaces. Reagents are typically arranged in reagent containers.

A reagent container can be embodied as an individual container of any shape and material, e.g., plastic or glass, or as a cassette containing an individual reagent container or a plurality of reagent containers containing the same or different reagents, and can be adapted to be placed in appropriate receptacles or positions within a storage compartment or conveyor of an in-vitro diagnostic system. Other types of reagents or system fluids may be provided in bulk containers or via a line supply.

According to certain embodiments, the reagents are dry or lyophilized reagents, provided, e.g., in sealed glass reagent containers.

According to certain embodiments the reagents are coagulation reagents. According to an embodiment, the in-vitro diagnostic system comprises a coagulation analyzer for carrying out coagulation tests and involving the use of coagulation reagents. In particular, some coagulation reagents are provided in lyophilized form, e.g., thromboplastin reagents used for Prothrombin Time (PT) testing, in order to increase their shelf life. Some reagents can be provided in liquid form, including some coagulation reagents. For example, in contrast to the PT reagents, the Activated Partial Thromboplastin Time (APTT) reagent may come as a liquid formulation. This is because the activator which initiates the clotting reaction, unlike the thromboplastin reagent, is an inert substance that has no inherent biological function. It is the charged nature of this substance that reacts with clotting factor XII (the starting point of the APTT) rather than enzymatic activity. Consequently, the reagent is stable as a liquid, although the shelf life is somewhat shorter than the lyophilized reagents. Once opened, open container stability issues apply as exposure to air initiates a slow decline in the stability of the product. In contrast, reagents such as calcium chloride are inert chemicals; hence they can have both a longer shelf life and a longer stability even after opening.

Some reagents requiring relatively larger volumes of liquid for testing, e.g., used for carrying out some hematology tests, come as concentrated liquid formulations in closed reagent containers and have to be diluted before use in a test. Thus, storing and handling, including transporting and moving, of larger volumes and heavier containers can be prevented by diluting the concentrated liquid reagents on-site before use. Once the reagent container is opened, the same open container stability issues apply as exposure to air initiates a slow decline in the stability of the product.

According to certain embodiments, the reagents are thus concentrated liquid reagents. According to certain embodiments the reagents are hematology reagents. According to an embodiment, the in-vitro diagnostic system comprises a hematology analyzer for carrying out hematology tests and involving the use of hematology reagents.

According to other embodiments the reagents may be any other type of reagents for use in in-vitro diagnostics.

A "calibrator" is a calibration solution that contains known values of one or more calibration materials used for calibration and that is measured under the same conditions as a sample, typically including the use of reagents. Calibrators can be provided in different levels that correspond to different concentration ranges of the calibration materials, including zero concentration, i.e., a blank solution. Typically, one or two levels of the same calibrator are used for a one-point or two-point calibration respectively, in case of linear response to analyte concentrations. Three or more calibrator levels, e.g., up to five, six or more levels may be used if the calibration curve is non-linear.

A "calibration material" can be an analyte identical to an analyte of interest, the concentration of which is known, or that generates by reaction or derivatization, e.g., by fragmentation, an analyte identical to an analyte of interest, the concentration of which is known, or it can be any other equivalent substance of known concentration, which mimics the analyte of interest or that can be otherwise correlated to a certain analyte of interest.

A "calibration" is a procedure that enables to correlate a measured sample signal to a quantitative result of analyte concentration in a sample by measuring known values of calibration materials present in calibrators under the same conditions of the measured sample, including the same workflow and the use of the same reagent(s). Depending on the type of signal and especially linearity or non-linearity of the signal at different concentrations, which may vary depending on the particular sample, particular analyte(s) of interest, on the particular workflow and measuring conditions, the calibration procedure may comprise measuring one or more levels of calibrators corresponding to different concentration ranges of the calibration materials that fall in the range of detection of the analyzer (dynamic range) and/or the typical range of concentrations of analytes that can be found in a sample. When only one calibrator level is measured, the calibration procedure is a one-point calibration procedure. When two levels of calibrator are measured, the calibration procedure is a two-point calibration procedure and so on. A "multi-point calibration procedure" is a calibration procedure that comprises measuring a plurality of calibrator levels, i.e., at least two and typically three or more, and in particular measuring a respective calibrator level for each of a plurality of calibration points, thereby obtaining a plurality of respective calibration points.

In accordance with other embodiments, a "calibration" can be also a procedure that enables to correlate a measured sample signal to a qualitative result, i.e., to the mere presence or absence of an analyte. In such case usually criteria are defined such as a threshold or cut-off that separate the normal healthy samples from the abnormal pathogenic samples. For qualitative calibration often two calibration solutions are used: one with no analyte present (negative calibrator) and one with detectable amounts of analyte (positive calibrator).

Depending on the particular sample, on the particular analyte(s) of interest, on the particular workflow, including sample/reagent(s) combination and measuring conditions, different calibration procedures may have to be executed, each possibly including a different calibrator or calibrators and eventually different levels of calibrators and/or a different number of levels and possibly including one, two or more reagents from respective reagent containers. Where more reagents are required, the respective reagent containers may be provided grouped in a multi-container reagent cassette or separated from each other. For example, a reagent cassette may comprise a plurality, e.g., two, three or more reagent containers of the same type and same lot, where reagents containers from different reagent cassettes may be required for calibration and/or testing.

"Calculating a calibration result" is the process of constructing a line or a curve, or a mathematical function, that has the best fit to the measured calibration points and including a regression analysis that takes into account statistical inference such as how much uncertainty is present in the constructed line or curve because of measurement errors due to unknown and/or random errors occurred in the process, by calculating the amount of variation or dispersion of the measured calibration points (standard deviation). The process may comprise comparing the constructed line or curve to a reference line or curve or previously constructed lines or curves respectively under the same conditions and/or comparing individual calibration points to reference values or previously measured values.

"Determining failure or passing" of a calibration based on the calculated result is the process of quantifying the measurement error and determining whether the error is smaller than a requirement threshold value according to a specification of the in-vitro diagnostic system. In particular, failure of the calibration is determined when the error is greater than the requirement threshold value, whereas passing of the calibration is determined when the error is smaller than the requirement threshold value.

"Releasing" a calibration is the step of enabling a passed calibration for use by the in-vitro diagnostic system and in connection to the reagent container or containers that it refers to.

"Activating" a calibration is the step of selecting a released calibration for use by the in-vitro diagnostic system and in connection to the reagent container or containers that it refers to. Thus releasing a calibration does not necessarily imply that it is the one referred to by the in-vitro diagnostic system, as there may be more than one released calibrations in connection to the same reagent container or containers, whereas only one at a time can be used in connection to a particular reagent container. Thus a released calibration needs to be activated in order to be used, thereby becoming the "active calibration".

Releasing can be either a manual or automatic procedure, wherein activation according to the method of this disclosure is an automatic procedure.

A "lot calibration" is the result of a calibration procedure that is obtained using a reagent container of a given lot and that is applicable not only to the same reagent container but also to other reagent containers of the same lot, at least to those available or that become available to the in-vitro diagnostic system, within a lot calibration time period.

A "lot calibration time period" is a time window having a predefined time length starting from the time when the lot calibration becomes available.

"Determining a time period or a time limit or an expiration time" according to the present disclosure comprises determining the start of the time period and calculating the end of the time period once the start is determined, being the length pre-determined. The length of the time period may vary between reagent containers and is typically predetermined based on the reagent container type, reagents contained therein and use of the reagents.

The time when a calibration becomes available may refer to the time when the result of the calibration procedure becomes available, e.g., once passing of the calibration is determined, or to the time when the calibration is released or to the time when it is activated, depending on the particular use case and, e.g., depending on the fact whether a calibration is manually or automatically released.

The time when a reagent container becomes available to the in-vitro diagnostic system may refer to the time when a reagent container is loaded into the in-vitro diagnostic system and registered by the in-vitro diagnostic system or to the time when a reagent container becomes available for use by the in-vitro diagnostic system, e.g., only after opening of the reagent container or after reconstituting or diluting a reagent in the reagent container, depending on the particular use case, e.g., depending on the in-vitro diagnostic system and/or on the reagent container/reagent.

The term "linking a reagent container to a calibration" refers to the process of creating a virtual link between a reagent container and a calibration result, where the calibration result is electronically saved only once in a calibration library at a memory location. Thus if more than one reagent container refers to the same calibration, e.g., a lot calibration, a link to the same file is established without the need to copy the calibration file or modify the file with respect to each reagent container that it is associated with. Also the link is dynamic in the sense that it can be replaced with a new link, it can be removed or disabled or re-established, without modifying the original file. In particular, removing or disabling or replacing a link is not an irreversible process and in some particular cases a link to a previous calibration may be re-established.

According to an embodiment, the method comprises determining an "individual linked-container time period" applicable to an individual reagent container, in which a lot calibration can be linked to the individual reagent container, having a predefined time length starting from the time when the individual linked reagent container becomes available, e.g., is ready for use, by the in-vitro diagnostic system, where replacing the existing link to the previous lot calibration with a link to the new lot calibration is allowed only within the individual linked-container time period and within the lot calibration time period.

According to an embodiment, the method comprises determining a lot calibration time limit, until which a new lot calibration can be obtained or at least ordered by using an individual reagent container of the lot made available to the in-vitro diagnostic system, having a predefined length starting from the time when the individual reagent container becomes available, e.g., ready for use, by the in-vitro diagnostic system.

According to an embodiment, the method comprises removing or disabling the link to the lot calibration from an individual linked reagent container at the latest when the individual linked-container time period ends, and removing or disabling the link to the lot calibration from any still linked reagent containers at the latest when the lot calibration time period ends.

According to an embodiment, the method comprises triggering a container-specific calibration using a specific reagent container, and after release of the container-specific calibration linking the container-specific calibration to the specific reagent container before enabling further use of the specific reagent container by the in-vitro diagnostic system once the link to a lot calibration has been removed or disabled.

According to an embodiment, the method comprises determining a container-specific calibration time period, applicable to the specific reagent container.

A "container-specific calibration" is the result of a calibration procedure that is obtained using a specific reagent container and that is applicable to that specific reagent container only, within a container-specific calibration time period.

A "container-specific calibration time period" is a time window having a predefined time length starting from the time when the container-specific calibration becomes available.

The term "trigger" or "triggering" is herein used to intend either an automatic procedure that is initiated and executed by the in-vitro diagnostic system automatically or a warning generated by the in-vitro diagnostic system and prompting a user to manually intervene or a semiautomatic procedure as a combination of both.

According to an embodiment, the method comprises determining an "open-container expiration time" having a predefined time length starting from the time of first opening the reagent container beyond which the individual linked-container time period and the container-specific calibration time period cannot extend.

According to an embodiment, for a given sample/analyte/reagent combination, that is for a given in-vitro diagnostic test, the method comprises allowing only one active calibration at a time and one active reagent container of a certain lot at time being used by the in-vitro diagnostic system, thereby determining an "active calibration/reagent container pair". However, if an in-vitro diagnostic test requires more than a reagent/reagent container and a calibration is based respectively on more than one reagent/reagent container, eventually even from different lots, the active calibration/ reagent container pair may include one calibration and multiple reagent containers.

According to an embodiment, the method comprises automatically selecting the active calibration/reagent container pair by activating a reagent container that has either an available lot calibration or an available container-specific calibration linked to it according to a first-available time priority, where a reagent container that becomes earlier available, e.g., earlier ready for use, and for which a calibration is available has a higher priority than a reagent container that becomes later available, e.g., later ready for use, and/or has not yet an available calibration linked to it.

According to an embodiment, the method comprises automatically checking whether a change of active calibration/reagent container pair is required any time that a linked calibration time period expires, e.g., when a lot calibration time period ends or when an individual linked-container time period ends, or when a container-specific calibration time period ends, or when a new calibration becomes available and/or when a change of status of the active reagent container occurs or another reagent container becomes available, and eventually automatically changing the active calibration/reagent container pair.

According to an embodiment, the change of status of the active reagent container comprises any one or more of reagent container empty or reagent level insufficient, open-container expiration time reached or exceeded, reagent container becomes unavailable because of unloading from in-vitro diagnostic system, or because of user choice or other reason.

According to an embodiment, the method comprises anticipating a change of active calibration/reagent container pair by triggering a container-specific calibration before a linked calibration time period expires or by making a new reagent container, e.g., a reagent container of the same lot, available, e.g., ready for use.

According to an embodiment, making the new reagent container available comprises automatically opening and/or reconstituting a dry or lyophilized reagent and/or diluting a concentrated reagent in a reagent container.

According to an embodiment, the method comprises automatically releasing lot calibrations and/or container specific calibrations by calculating calibration results and determining failure or passing of calibrations based on the calculated results.

An in-vitro diagnostic system comprising a calibration management system is herein also disclosed.

In particular, the calibration management system may comprise or be connected to a controller. The term "controller" encompasses any physical or virtual processing device and in particular a programmable logic computer with a processor running a computer-readable program provided with instructions to perform operations associated with the method of managing calibration according to any of the disclosed embodiments. The controller may be integrated into the in-vitro diagnostic system or be a separate logic entity in communication with the in-vitro diagnostic system. In some embodiments, the controller might be integral with a data management unit, may be comprised by a server computer and/or be distributed/shared across/between a plurality of in-vitro diagnostic systems. The controller may be also configurable to control the in-vitro diagnostic system in a way that workflow(s) and workflow step(s) are conducted by the in-vitro diagnostic system. In particular, the controller may communicate and/or cooperate with a scheduler and/or data manager in order to take into account incoming test orders and/or received test orders, and a number of scheduled process operations associated with the execution of the test orders in order to plan when and which calibrations have to be executed and/or activated, when and which reagent containers have to be made ready for use, and/or which active calibration/reagent container pair is to be selected.

In particular, the controller may be configured to execute any of the method steps according to any of the above described embodiments.

The controller may be further configured to prevent queueing up samples, for which a test order has been received but processing has not yet started, from entering the in-vitro diagnostic system and/or from starting a sample test workflow until an active calibration/reagent container pair is not activated. In this way, delay of routine operation due to missing calibration can be reduced and efficiency of operation can be increased.

In accordance with yet another embodiment, a computer-implemented method of automatically managing calibration of an in-vitro diagnostic system is herein also disclosed. The method comprises allowing only one active calibration at a time and one active reagent container of a certain lot at a time being used by the in-vitro diagnostic system, thereby determining an active calibration/reagent container pair. The method further comprises automatically selecting the active calibration/reagent container pair by activating a reagent container that has an available calibration linked to it according to a first-available time priority, where a reagent container that becomes earlier available, e.g., earlier ready for use, and for which a calibration is available has a higher priority than a reagent container that becomes later available, e.g., later ready for use, and/or has not yet an available calibration linked to it. However, if an in-vitro diagnostic test requires more than a reagent/reagent container and a calibration is based respectively on more than one reagent/ reagent container, eventually even from different lots, the active calibration/reagent container pair may include one calibration and multiple reagent containers.

According to an embodiment, the method comprises automatically checking whether a change of active calibration/reagent container pair is required any time that a linked calibration time period expires or a new calibration becomes available, and/or when a change of status of the active reagent container occurs, or another reagent container becomes available, and eventually automatically changing the active calibration/reagent container pair.

According to an embodiment, the change of status of the active reagent container comprises any one or more of reagent container empty or reagent level insufficient, open-container expiration time reached or exceeded, reagent container becomes unavailable because of unloading from in-vitro diagnostic system, or because of user choice or other reason.

According to an embodiment, the active calibration can be either a lot calibration or a container-specific calibration.

According to an embodiment, the method comprises determining a lot calibration time period, in which a lot calibration is applicable to reagent containers of the same lot, having a predefined time length starting from the time when the lot calibration becomes available. Upon making a reagent container of the lot available to the in-vitro diagnostic system, the method further comprises determining whether a lot calibration that has not exceeded the lot calibration time period is available and linking the reagent container to the available lot calibration or most recent available lot calibration if more than one lot calibration is available, and if a new lot calibration for the same lot becomes available the method comprises replacing the existing link to the previous lot calibration with a link to the new lot calibration.

According to an embodiment, the method comprises determining an individual linked-container time period applicable to an individual reagent container, in which a lot calibration can be linked to the individual reagent container, having a predefined time length starting from the time when the individual linked reagent container becomes available to the in-vitro diagnostic system, e.g., ready for use by the in-vitro diagnostic system, where replacing the existing link to the previous lot calibration with a link to the new lot calibration is allowed only within the individual linked-container time period and within the lot calibration time period.

According to an embodiment, the method comprises determining a lot calibration time limit, until which a new lot calibration can be obtained or at least ordered by using an individual reagent container of the lot made available to the in-vitro diagnostic system, having a predefined length starting from the time when the individual reagent container becomes available to the in-vitro diagnostic system, e.g., ready for use by the in-vitro diagnostic system, the lot calibration time limit being shorter than the individual linked-container time period for the same individual reagent container.

According to an embodiment, the method comprises removing or disabling the link to the lot calibration from an individual linked reagent container at the latest when the individual linked-container time period ends and removing or disabling the link to the lot calibration from any still linked reagent containers at the latest when the lot calibration time period ends.

According to an embodiment, the method comprises triggering a container-specific calibration using a specific reagent container, and after release of the container-specific calibration linking the container-specific calibration to the specific reagent container, before enabling further use of the specific reagent container by the in-vitro diagnostic system once the link to a lot calibration has been removed or disabled.

According to an embodiment, the method comprises determining a container-specific calibration time period, applicable to the specific reagent container, having a predefined time length starting from the time when the container-specific calibration becomes available.

According to an embodiment, the method comprises determining an open-container expiration time having a predefined time length starting from the time of first opening the reagent container beyond which the individual linked-container time period and the container-specific calibration time period cannot extend.

According to an embodiment, the method comprises anticipating a change of active calibration/reagent container pair by triggering the container-specific calibration before a linked calibration time period expires or by making a new reagent container, e.g., of the same lot available.

According to an embodiment, making the new reagent container available comprises automatically opening and/or reconstituting a dry or lyophilized reagent, and/or diluting a concentrated reagent in a reagent container.

According to an embodiment, the method comprises automatically releasing lot calibrations and/or container specific calibrations by calculating calibration results and determining failure or passing of calibrations based on the calculated results.

In accordance with yet another embodiment, an in-vitro diagnostic system is herein also disclosed comprising a calibration management system running a computer-readable program provided with instructions to perform operations associated with the method of managing calibration according to any of the above embodiments of the further method.

Other and further objects, features and advantages will appear from the following description of exemplary embodiments and accompanying drawings, which serve to explain the principles more in detail.

Methods, software/computer program products, devices and systems according to various illustrated embodiments will now be described more fully hereinafter. Indeed, the methods, software/computer program products, devices and systems may be embodied in many different forms and should not be construed as limited to the embodiments set forth and illustrated herein.

Likewise, many modifications and other embodiments of the methods, software/computer program products, devices and systems described herein will come to mind to one of skill in the art to which the disclosure pertains having the benefit of the teachings presented in the foregoing descriptions and the associated drawings. Therefore, it is to be understood that the methods, software/computer program products, devices and systems are not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the disclosure pertains. Although any methods and materials similar to or equivalent to those described herein can be used in the practice or testing of the methods, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one." Likewise, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. For example, the expressions "A has B," "A comprises B" and "A includes B" may refer both to a situation in which, besides B, no other element is present in A (i.e., a situation in which A solely and exclusively consists of B) or to a situation in which, besides B, one or more further elements are present in A, such as element C, elements C and D, or even further elements.

Also, reference throughout the specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

Methods

The methods hereinafter described and illustrated, e.g., by FIGS. 1-9, include steps that may be, but not necessarily, carried out in the sequence as described. Other sequences, however, also are conceivable. Furthermore, individual or multiple steps may be carried out either in parallel and/or overlapping in time and/or individually or in multiple repeated steps. Moreover, the methods may include additional, unspecified steps.

FIG. 1 schematically depicts first aspects of a computer-implemented method A of automatically managing calibration of an in-vitro diagnostic system. 1. The method A comprises determining a lot calibration time period 10, in which a lot calibration 1 is applicable to reagent containers of the same lot, having a predefined time length starting from the time when the lot calibration 1 becomes available 11. Upon making a reagent container n of the lot available 40 to the in-vitro diagnostic system determining whether a lot calibration 1 that has not exceeded the lot calibration time period 10 is available 11 and linking 12 the reagent container n to the available lot calibration 1. The method A comprises determining an individual linked-container time period 41 applicable to an individual reagent container n, in which a lot calibration 1 can be linked 12 to the individual reagent container n, having a predefined time length starting from the time when the individual linked reagent container n becomes available 40 to the in-vitro diagnostic system. The method A comprises determining a lot calibration time limit 42, until which a new lot calibration can be obtained or at least ordered by using an individual reagent container n of the lot made available 40 to the in-vitro diagnostic system, having a predefined length starting from the time when the individual reagent container becomes available 40 to the in-vitro diagnostic system. The method A comprises determining an open-container expiration time 44 having a predefined time length starting from the time of first opening the reagent container 40 beyond which the individual linked-container time period 41 cannot extend. For explanation of the asterisk * in FIG. 1, see FIG. 4 below.

Figure 2:
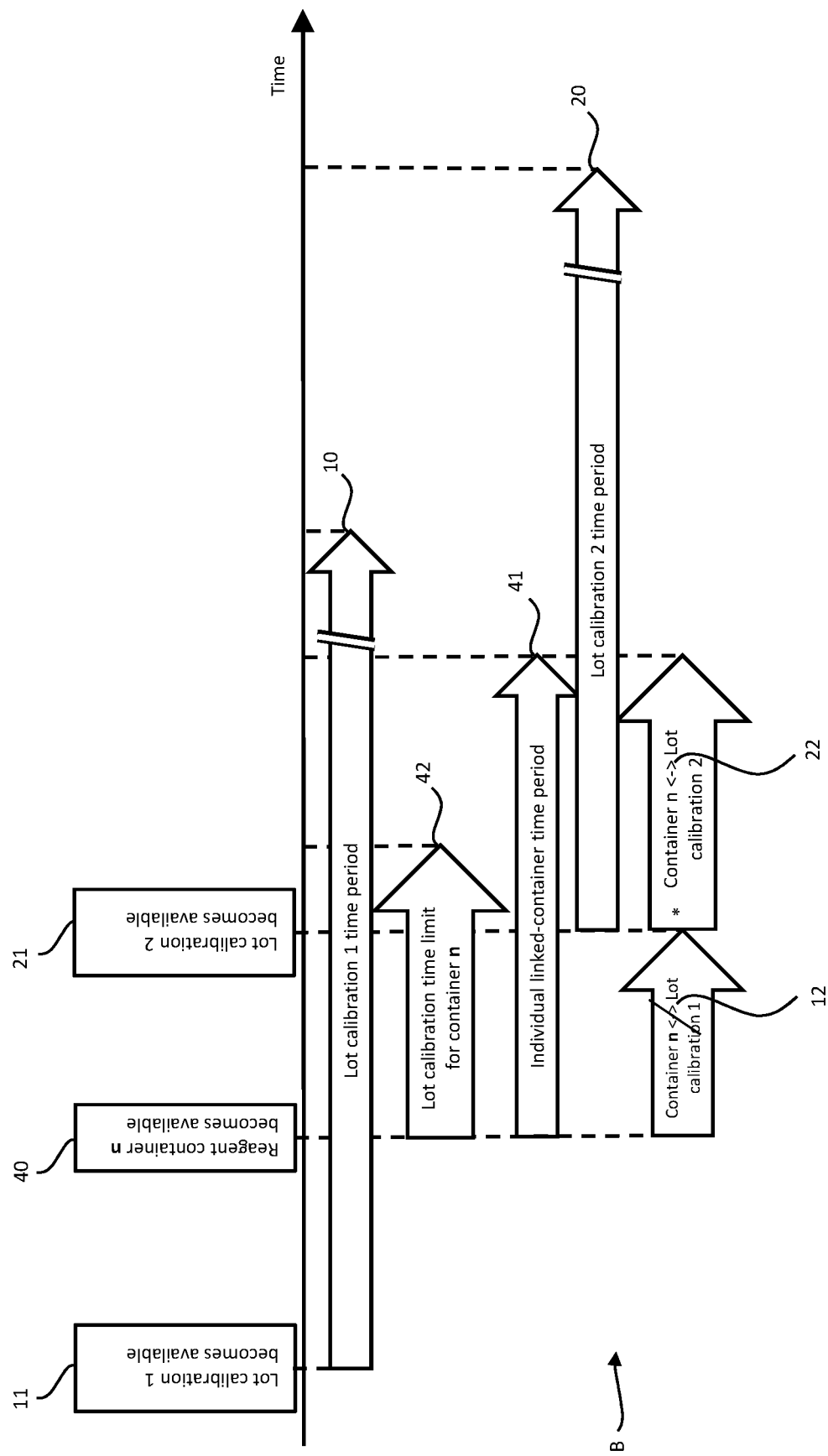
FIG. 2 schematically depicts further aspects of a computer-implemented method B in accordance with an embodiment of the present disclosure of automatically managing calibration of an in-vitro diagnostic system.

FIG. 2 schematically depicts further aspects of a computer-implemented method B of automatically managing calibration of an in-vitro diagnostic system, the method B comprising the method A of FIG. 1. In particular, the method B with respect to method A further comprises making a lot calibration 2 for the same lot available 21 by using the reagent container n that has become available 40 within the lot calibration time period 42 for container n, and as a new lot calibration 2 for the same lot becomes available 21 the method B comprises replacing the existing link 12 to the previous lot calibration 1 with a link 22 to the new lot calibration 2. The method B further comprises determining a lot calibration 2 time period 20, in which the lot calibration 2 is applicable to reagent containers of the same lot, having a predefined time length starting from the time when the lot calibration 2 becomes available 21. Replacing the existing link 12 to the previous lot calibration with a link to the new lot calibration 22 is allowed only within the individual linked-container time period 41 and within the lot calibration 1 time period 10. For explanation of the asterisk * in FIG. 2, see FIG. 4 below.

Figure 3:
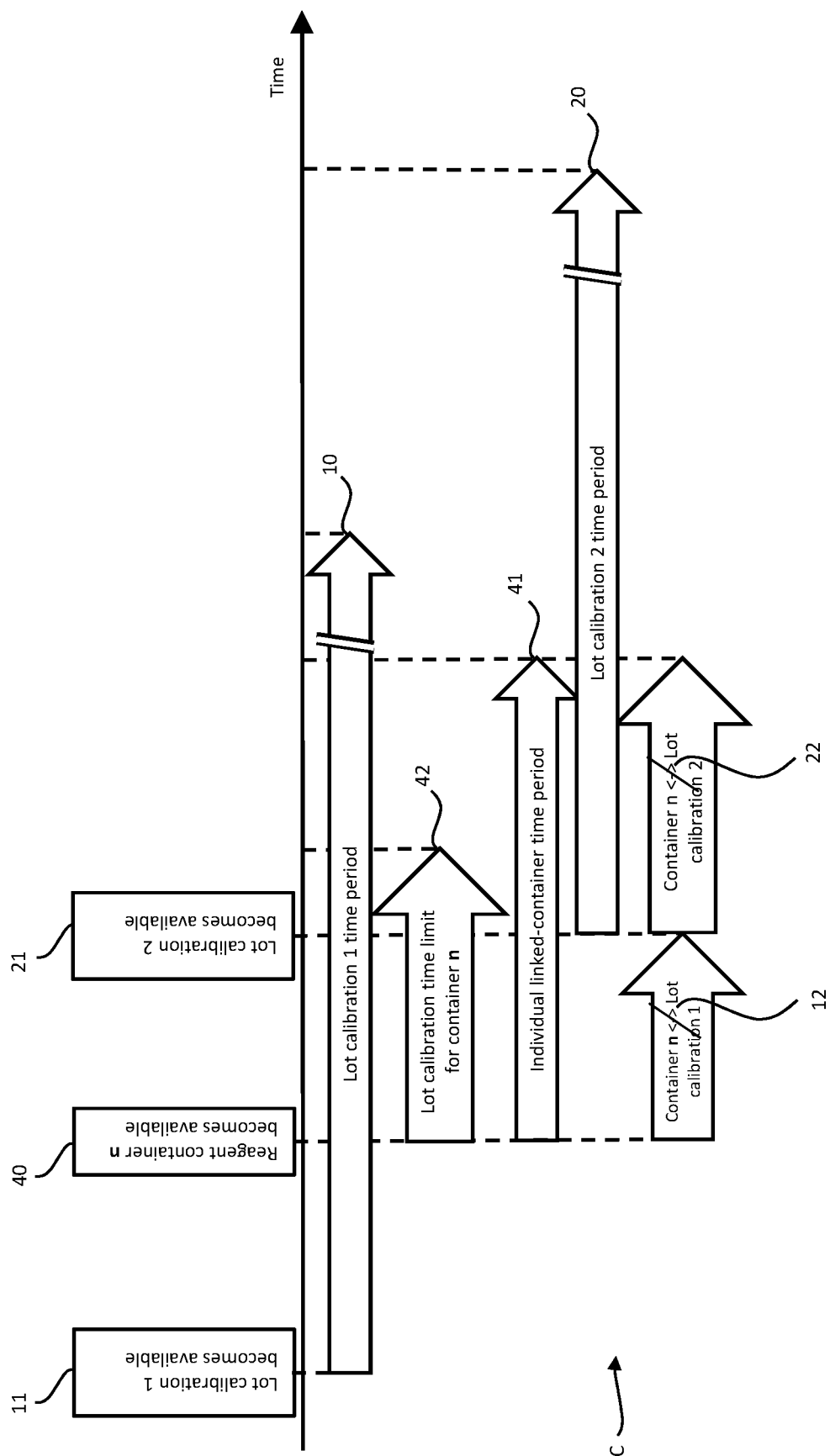
FIG. 3 schematically depicts further aspects of a computer-implemented method C in accordance with an embodiment of the present disclosure of automatically managing calibration of an in-vitro diagnostic system.

FIG. 3 schematically depicts further aspects of a computer-implemented method C of automatically managing calibration of an in-vitro diagnostic system. In particular, method C is a possible continuation of the method B of FIG. 2, the method C further comprising removing or disabling the link 22 to the lot calibration 2 from the individual linked reagent container n at the latest when the individual linked-container time period 41 ends. In case of any other still linked reagent container (not shown) the method comprises removing or disabling the link to the lot calibration 1 or 2 from any still linked reagent containers at the latest when the lot calibration time period 1 and/or 2 respectively ends if the individual linked-container time period has not previously ended already.

Figure 4:
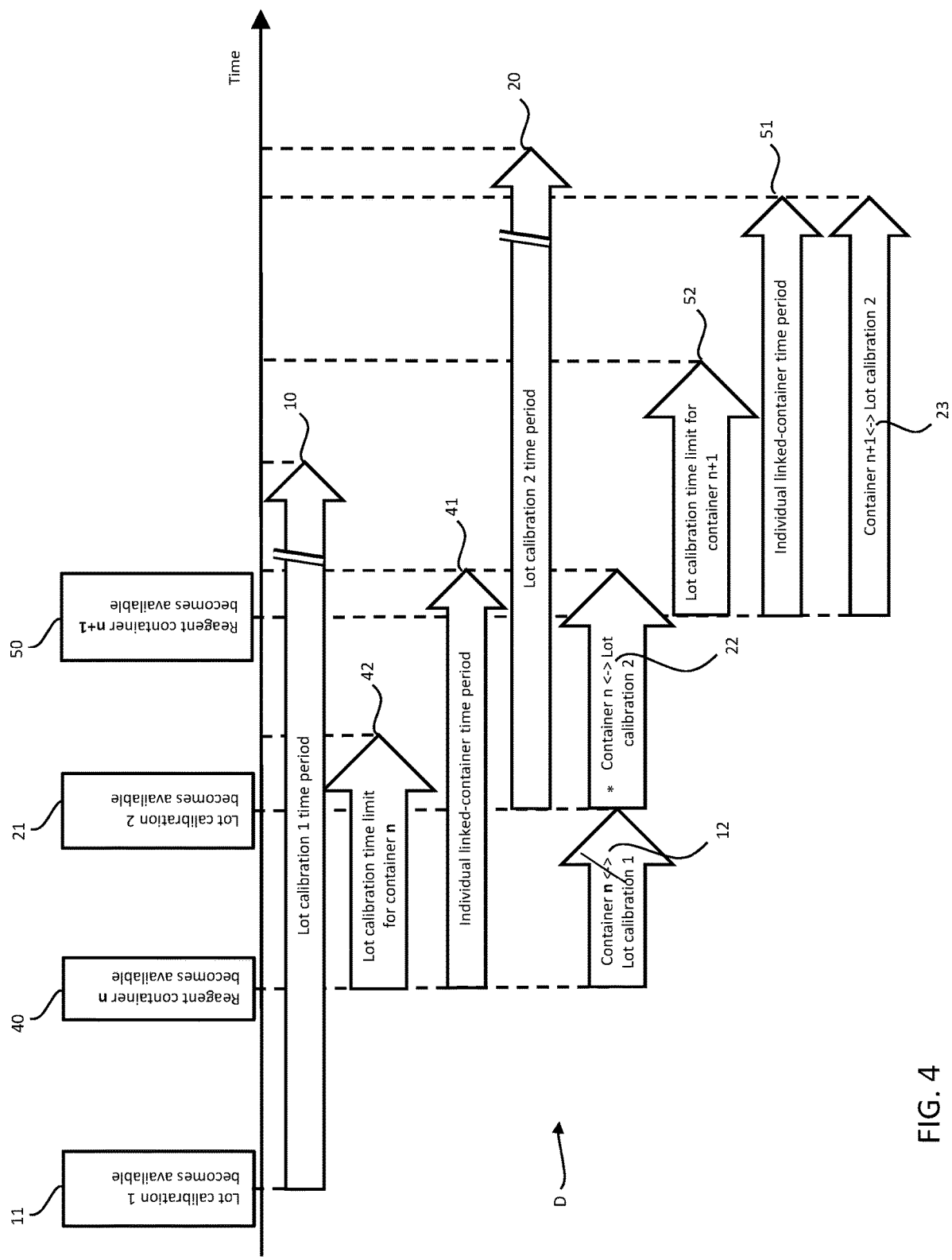
FIG. 4 schematically depicts further aspects of a computer-implemented method D in accordance with an embodiment of the present disclosure of automatically managing calibration of an in-vitro diagnostic system.

FIG. 4 schematically depicts further aspects of a computer-implemented method D of automatically managing calibration of an in-vitro diagnostic system. In particular, method D is another possible continuation of the method B of FIG. 2, the method D further comprising, upon making a reagent container n+1 of the lot available 50 to the in-vitro diagnostic system determining whether a lot calibration 1, 2 that has not exceeded the lot calibration time period 10, 20 is available 11, 21 and linking 23 the reagent container n+1 to the most recent available lot calibration 2 if more than one lot calibration 1,2 is available 11, 21. The method D comprises determining an individual linked-container time period 51 applicable to an individual reagent container n+1, in which a lot calibration, in this case lot calibration 2, can be linked 23 to the individual reagent container n+1, having a predefined time length starting from the time when the individual linked reagent container n+1 becomes available 50 to the in-vitro diagnostic system. The method D comprises determining a lot calibration time limit 52, until which a new lot calibration can be obtained or at least ordered by using the individual reagent container n+1 of the lot made available to the in-vitro diagnostic system, having a predefined length starting from the time when the individual reagent container becomes available 50 to the in-vitro diagnostic system. In FIG. 4, it can be further noticed that there is a container n linked 22 to the lot calibration 2 and a container n+1 linked 23 to the same lot calibration 2. The method D further comprises allowing only one active calibration 2 at a time and one active reagent container n of a certain lot at time being used by the in-vitro diagnostic system, thereby determining an active calibration/reagent container pair 22, indicated with an asterisk *. Also in FIG. 2, the calibration/reagent container pair 22 is the active pair *, whereas in FIG. 1, the calibration/reagent container pair 12 is the active pair *. With continued reference to FIG. 4, the method D further comprises automatically selecting the active calibration/reagent container pair * by activating a reagent container n that has an available lot calibration 2 linked to it 22 according to a first-available time priority, where a reagent container n that becomes earlier available 40 and for which a calibration 2 is available 21 has a higher priority than a reagent container n+1 that becomes later available 50 and/or in case reagent container n+1 had not yet an available calibration 2 linked to it 23 yet.

Figure 5:
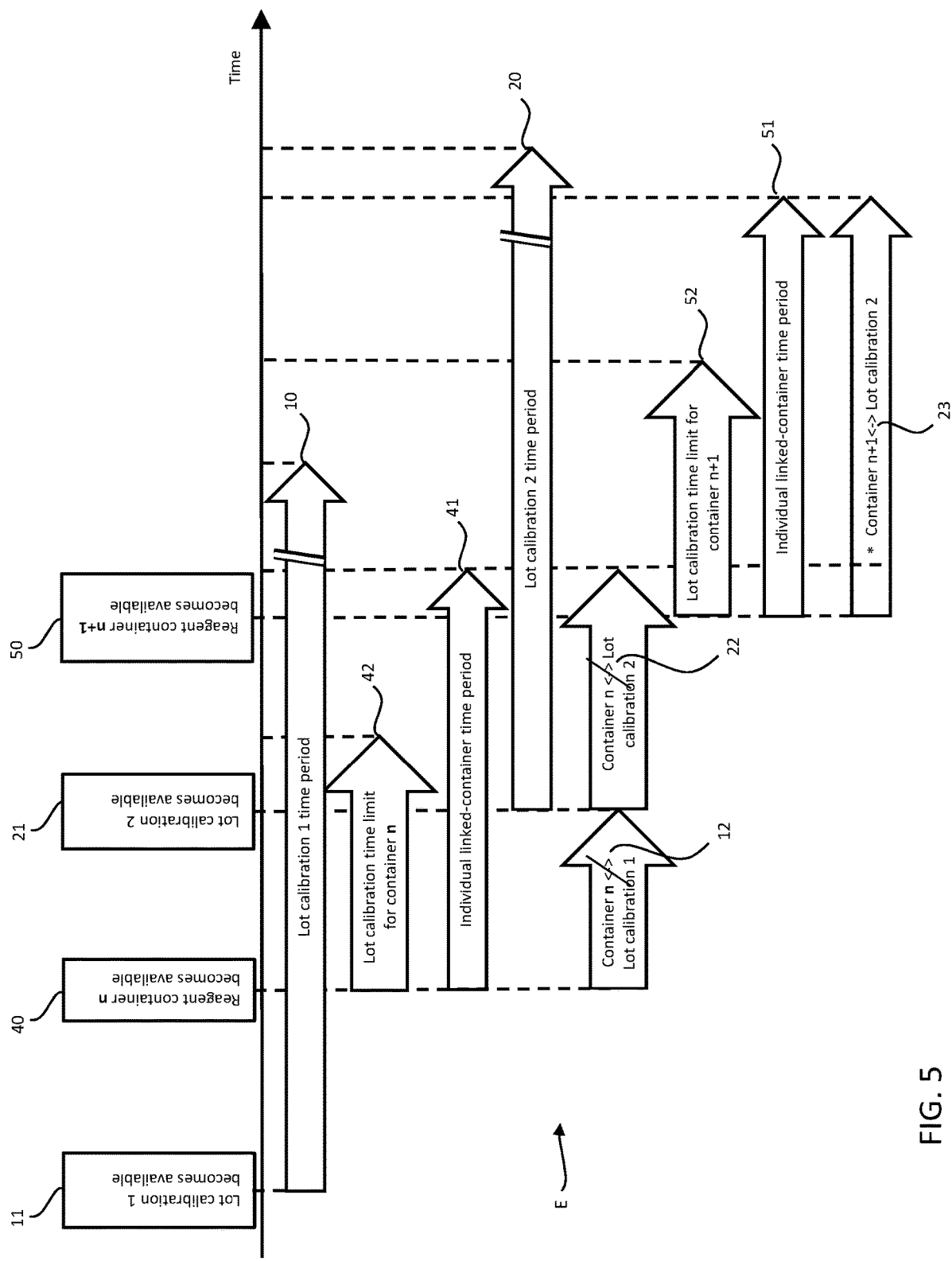
FIG. 5 schematically depicts further aspects of a computer-implemented method E in accordance with an embodiment of the present disclosure of automatically managing calibration of an in-vitro diagnostic system.

FIG. 5 schematically depicts further aspects of a computer-implemented method E of automatically managing calibration of an in-vitro diagnostic system. In particular, method E is a possible continuation of the method D of FIG. 4, where according to the method E, the active calibration/reagent container pair * is automatically switched from the reagent container n/lot calibration 2 pair 22 to the reagent container n+1/lot calibration 2 pair 23 when the individual linked-container time period 41 for container n ends, and remains the new active calibration/reagent container pair * at the latest until the earliest of the individual linked-container time period 51 of reagent container n+1 and the lot calibration 2 time period ends. Also the link 22 between the container n and the lot calibration 2 can be removed or disabled as no longer needed.

Figure 6:
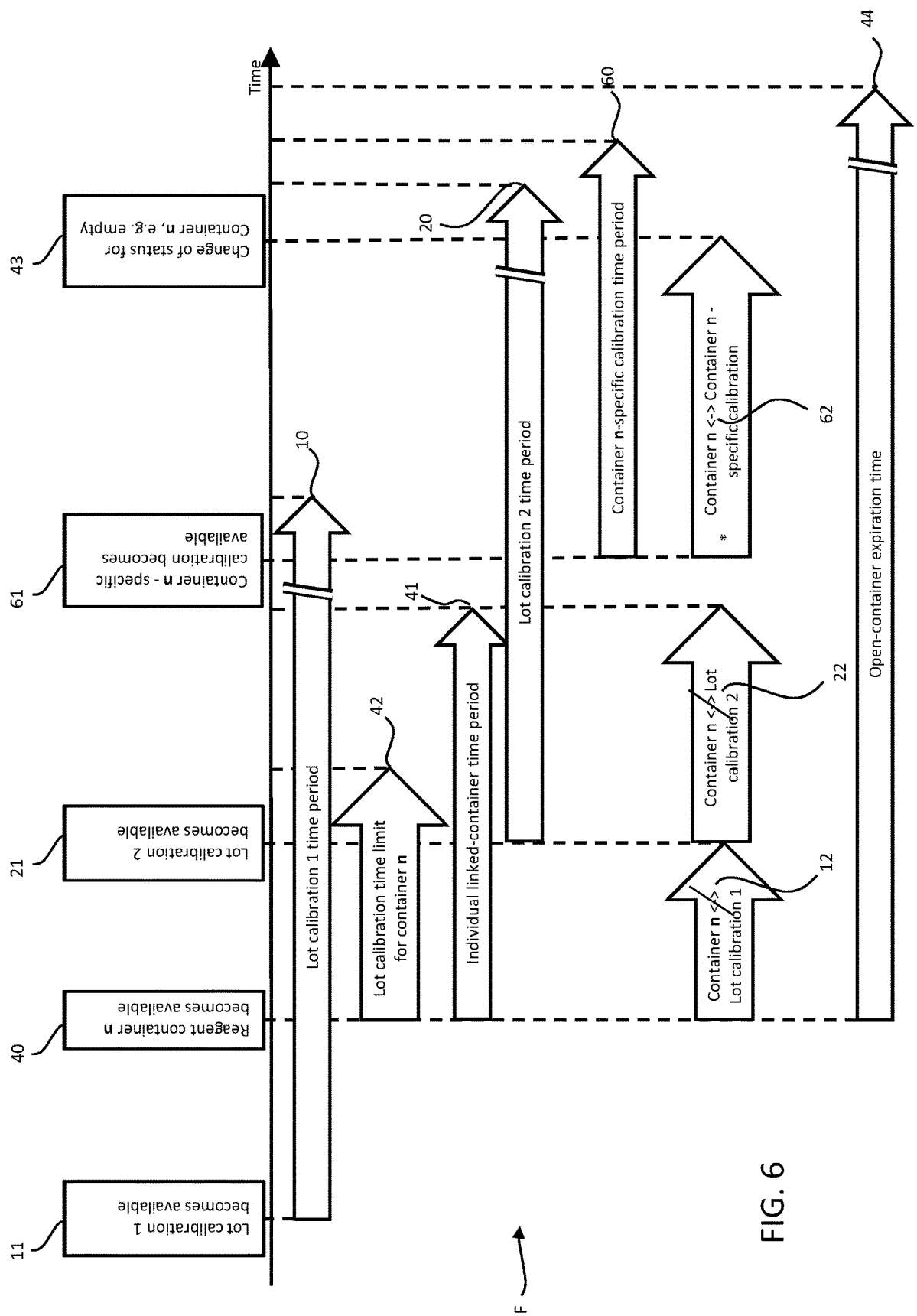
FIG. 6 schematically depicts further aspects of a computer-implemented method F in accordance with an embodiment of the present disclosure of automatically managing calibration of an in-vitro diagnostic system.

FIG. 6 schematically depicts further aspects of a computer-implemented method F of automatically managing calibration of an in-vitro diagnostic system. In particular, method F is another possible continuation of the method C of FIG. 3, the method F further comprising triggering a container n-specific calibration using the specific reagent container n and after release of the container-specific calibration 61 linking 62 the container n-specific calibration to the specific reagent container n before enabling further use of the specific reagent container n by the in-vitro diagnostic system once the link 12, 22 to a lot calibration 1, 2 has been removed or disabled.

The method F further comprises determining a container n-specific calibration time period 60, applicable to the specific reagent container n, having a predefined time length starting from the time when the container-specific calibration becomes available 61. It is further noted that also the container n-specific calibration time period 60, analogously to the individual linked-container time period 41 for container n, may not extend beyond the open-container expiration time 44 for container n.

In this case, the container n/container n-specific calibration pair becomes the new active pair * at the latest until the earliest of the end of the container n-specific calibration time period 60 or a change of status 43 for container n occurs, e.g. reagent container n empty or reagent level in reagent container n insufficient, open-container expiration time 44 reached or exceeded (not in the example of FIG. 6), reagent container n becomes unavailable because of unloading from the in-vitro diagnostic system or because of user choice or other reason.

Figure 7:
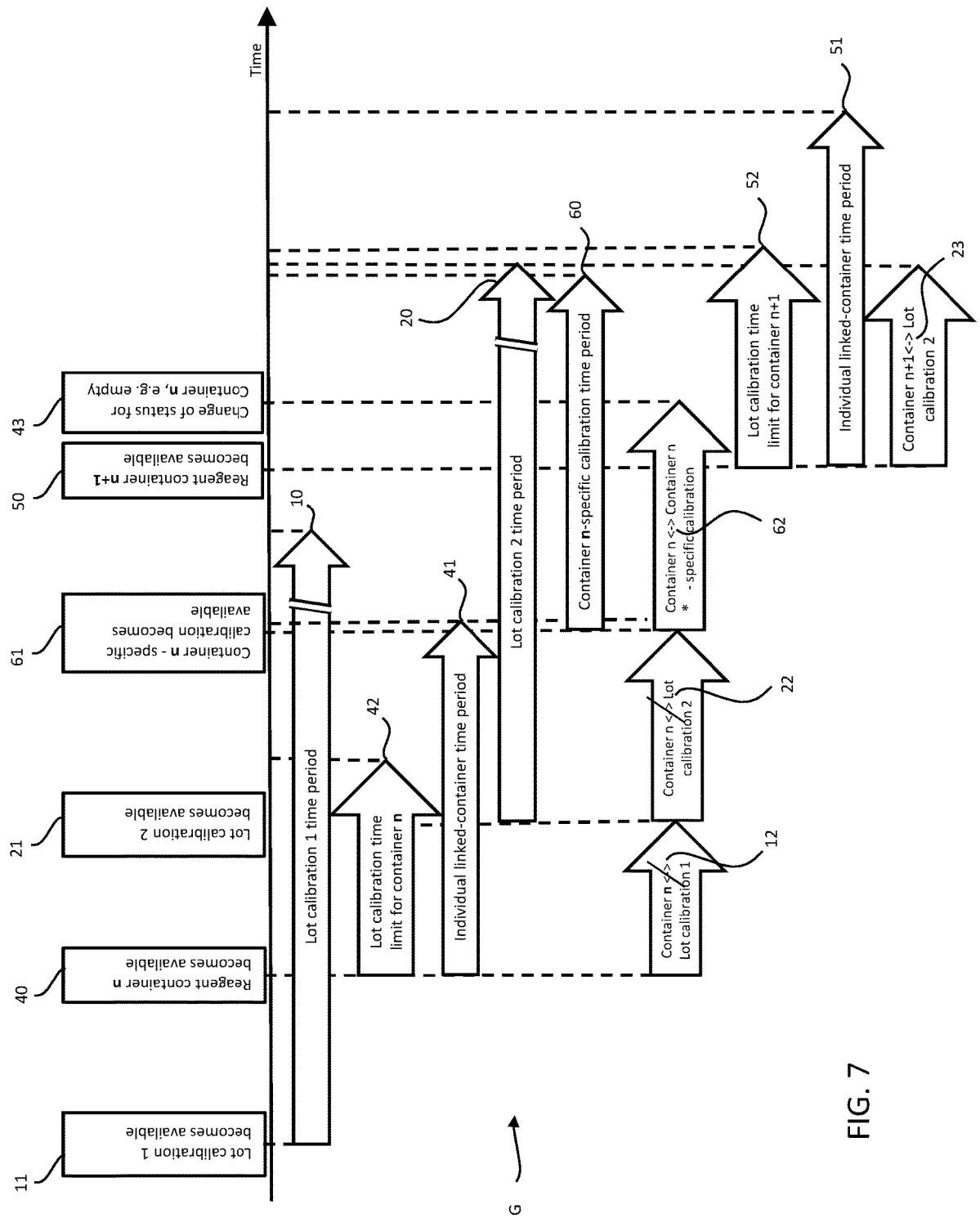
FIG. 7 schematically depicts further aspects of a computer-implemented method G in accordance with an embodiment of the present disclosure of automatically managing calibration of an in-vitro diagnostic system.

FIG. 7 schematically depicts further aspects of a computer-implemented method G of automatically managing calibration of an in-vitro diagnostic system. In particular, method G is similar to the method F of FIG. 6 and represents another possible continuation of the method C of FIG. 3, the method G further comprising anticipating a change of active calibration/reagent container pair * by triggering a container n-specific calibration 61 before e.g. the linked lot calibration 2 time period expires 20, and in this case before the individual linked-container time period 41 for container n expires, and/or by making a new reagent container n+1 available before the container n-specific calibration time period 60 ends or a change of status for reagent n occurs.

According to an embodiment, making the new reagent container n+1 available 50 comprises automatically opening and/or reconstituting a dry or lyophilized reagent and/or diluting a concentrated reagent in the reagent container n+1. As this procedure may require time, the method of automatically managing calibration of an in-vitro diagnostic system comprises taking into account the required time for making the new reagent container n+1 available.

Analogously to the method D of FIG. 4, upon making the reagent container n+1 of the same lot available 50 to the in-vitro diagnostic system, the method G of FIG. 7 comprises determining whether a lot calibration 2 that has not exceeded the lot calibration time period 20 is available 21 and linking 23 the reagent container n+1 to the available lot calibration 2 (in this case, the lot calibration 1 time period 10 is already expired and the lot calibration 1 is no longer available). The method G comprises determining an individual linked-container time period 51 applicable to the individual reagent container n+1, in which the lot calibration 2 can be linked 23 to the individual reagent container n+1, having a predefined time length starting from the time when the individual linked reagent container n+1 becomes available 50 to the in-vitro diagnostic system. The method G also comprises determining a lot calibration time limit 52, until which a new lot calibration can be obtained or at least ordered by using the individual reagent container n+1 of the lot made available to the in-vitro diagnostic system, having a predefined length starting from the time when the individual reagent container becomes available 50 to the in-vitro diagnostic system.

In particular, the method G may comprise waiting until just before the container n-specific calibration time period 60 ends or a change of status for reagent n occurs before making the reagent container n+1 of the same lot available 50 to the in-vitro diagnostic system. In this way, it can be prevented that the time periods which start upon making the reagent container n+1 available 50, like the open-container expiration time (not indicated in FIG. 7), the individual linked-container time period 51 and the lot calibration time limit 52, start unnecessarily too early.

The method G further comprises automatically selecting the active calibration/reagent container pair * by activating the reagent container n that has an available lot calibration 2 linked to it 22 or an available container n-specific calibration 62 according to a first-available time priority, where the reagent container n that becomes earlier available 40 and for which a container n-specific calibration is available 61 and linked 62 has a higher priority than the reagent container n+1 that becomes later available 50 and/or in case reagent container n+1 had not yet an available calibration 2 linked to it 23 yet. Moreover, if for the same reagent container n there are both a lot calibration 2 and a container-n-specific calibration available 21, 61, as in this case, the method may comprise selecting the container n/container n-specific calibration as the active pair *, even before the individual linked-container time period 41 ends, since a container-specific calibration may be more reliable for that specific reagent container than a lot calibration, eventually obtained with a different reagent container of the same lot. In this case, the lot calibration 2 and the n-specific calibration are obtained using the same reagent container n and it does not make a difference, except that the n-specific calibration is newer than the lot calibration 2 and can be preferred for this reason. Thus, in this example, the method G comprises automatically switching from the container n/lot calibration 2 pair 22 to the container n/container n-specific calibration 62 as the active pair * as soon as the container n-specific calibration becomes available 61.

Figure 8:
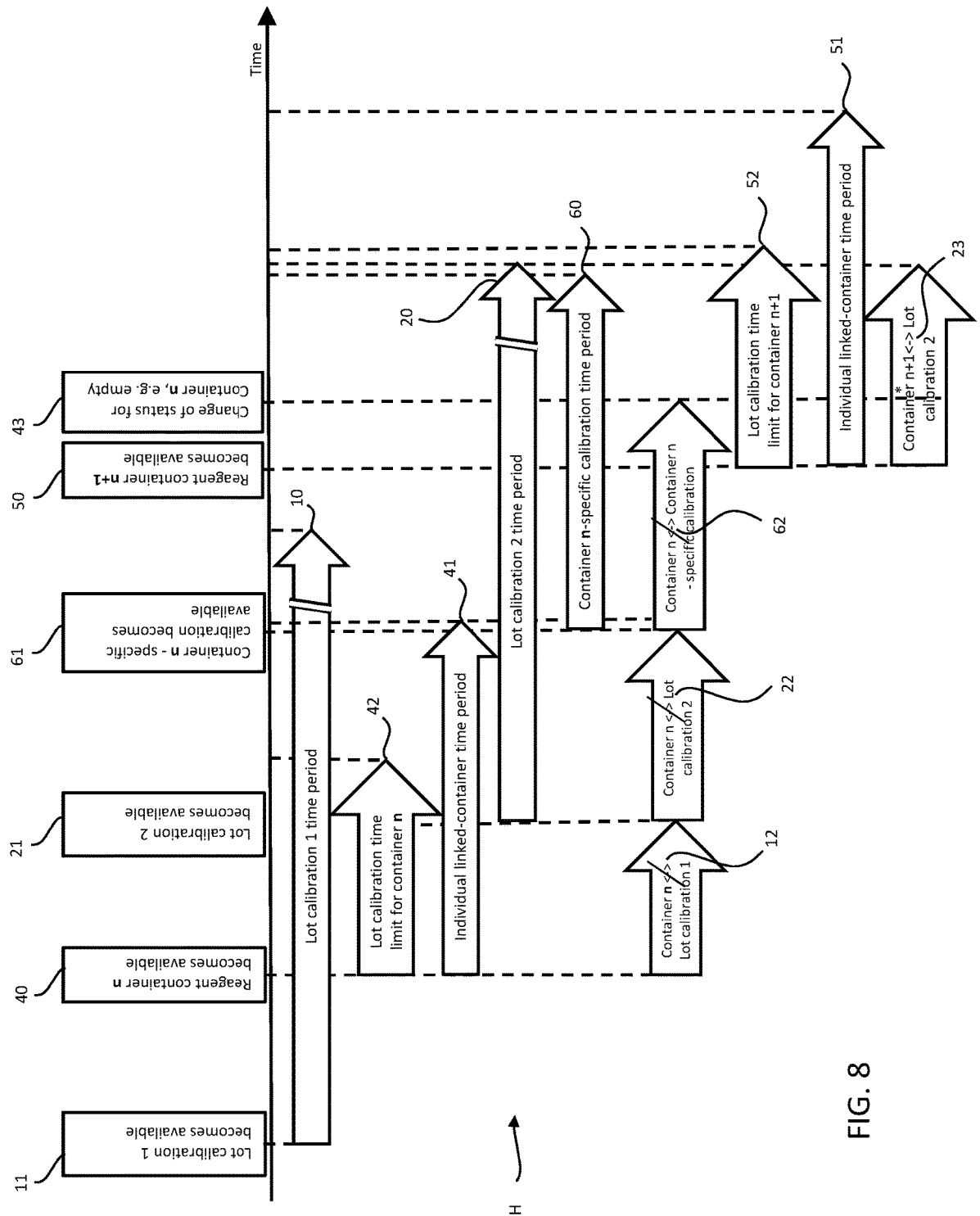
FIG. 8 schematically depicts further aspects of a computer-implemented method H in accordance with an embodiment of the present disclosure of automatically managing calibration of an in-vitro diagnostic system.

FIG. 8 schematically depicts further aspects of a computer-implemented method H of automatically managing calibration of an in-vitro diagnostic system. In particular, method H is a continuation of the method G of FIG. 7, the method H comprising maintaining the container n/container n-specific calibration pair 62 as the active pair * until the earliest of the end of the container n-specific calibration time period 60 or a change of status 43 for container n occurs (like in this case) and only then switching to the container n+1/lot calibration 2 pair 23 as the active pair *. It is in principle possible to obtain more than one consecutive reagent container n-specific calibrations using the reagent container n, e.g. if the reagent container n+1 was not available, as long as there is no change of status for container n, and as long as the open-container expiration time (not indicated in FIG.

8) has not been reached. In any case, only one active reagent container/calibration pair * at a time is allowed.

Figure 9:
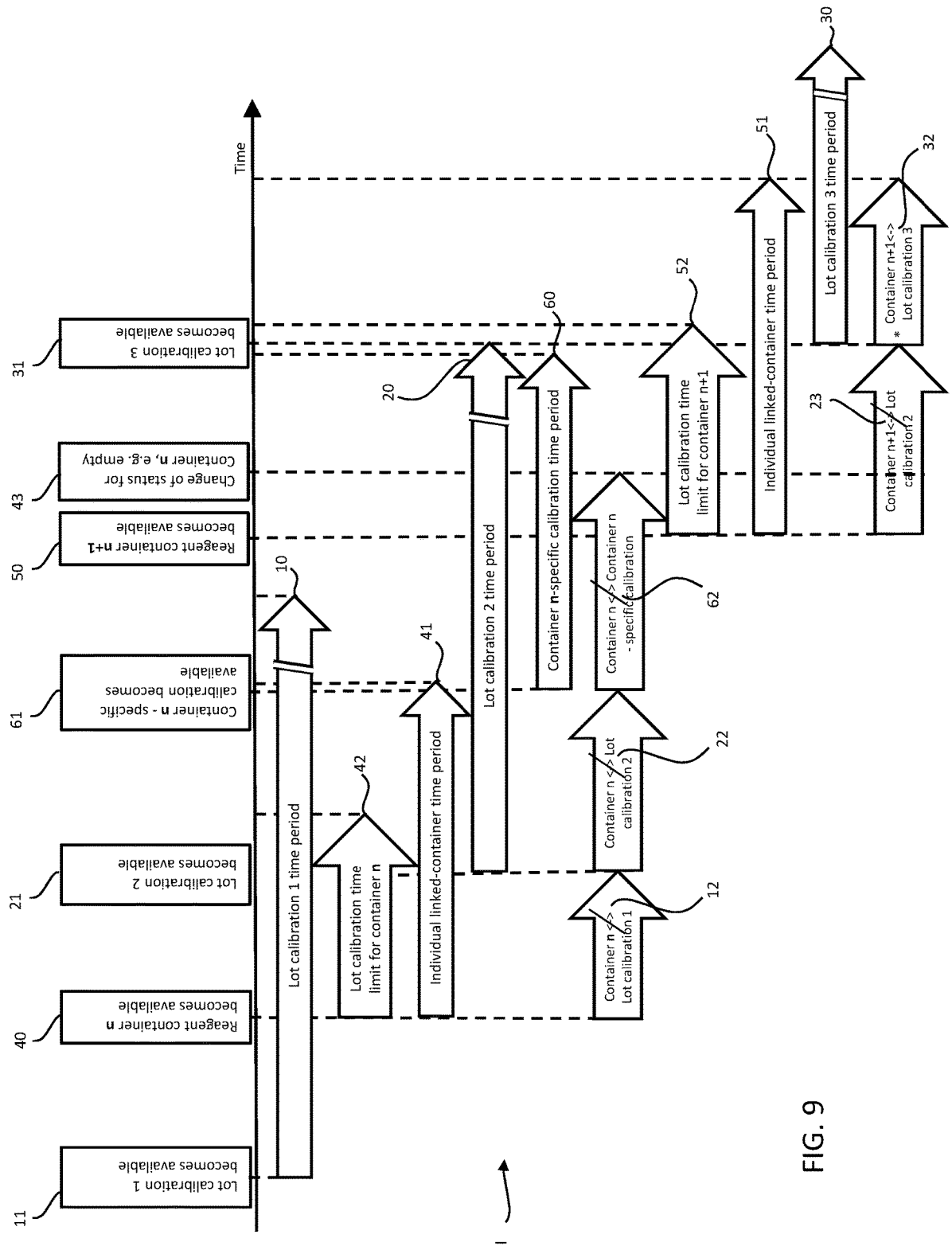
FIG. 9 schematically depicts further aspects of a computer-implemented method I in accordance with an embodiment of the present disclosure of automatically managing calibration of an in-vitro diagnostic system.

FIG. 9 schematically depicts further aspects of a computer-implemented method I of automatically managing calibration of an in-vitro diagnostic system. In particular, method I is a continuation of the method H of FIG. 8, the method I comprising making a lot calibration 3 available 31 by using the reagent container n+1 before the lot calibration time limit 52 for reagent container n+1 ends. As a new lot calibration 3 for the same lot becomes available 31 the method I comprises replacing the existing link 23 between reagent container n+1 and the previous lot calibration 2 with a link 32 to the new lot calibration 3. The method I further comprises determining a lot calibration 3 time period 30, in which the lot calibration 3 is applicable to reagent containers of the same lot, having a predefined time length starting from the time when the lot calibration 3 becomes available 31. Replacing the existing link 23 to the previous lot calibration 2 with the link 32 to the new lot calibration 3 is allowed only within the individual linked-container time period 51 and within the lot calibration 2 time period 20. If that does not occur, the link 23 to the previous lot calibration 2 is removed or disabled when the earliest of the lot calibration 2 time period 20 (in this case) and the individual-linked-container time period 51 ends, and only a container n+1-specific calibration would be possible if use of the reagent container n+1 is desired. When replacing the existing link 23 to the previous lot calibration 2 with the link 32 to the new lot calibration 3, the method I comprises also switching from the container n+1/calibration 2 pair 23 to the container n+1/lot calibration 3 pair 32 as the active pair *. This new link 32 and new active pair * is maintained until the individual linked-container time period 51 ends and so on.

With continued reference to FIG. 1-9 and methods A-I respectively, a further computer-implemented method of automatically managing calibration of an in-vitro diagnostic system is herein also disclosed. The method comprises allowing only one active calibration at a time 11, 21, 61, 31 and one active reagent container n, n+1 of a certain lot at a time being used by the in-vitro diagnostic system, thereby determining an active calibration/reagent container pair 12, 22, 23, 62, 32, *. The method further comprises automatically selecting the active calibration/reagent container pair * by activating a reagent container n, n+1 that has an available calibration 11, 21, 61, 31 linked to it according to a first-available time priority, where a reagent container n that becomes earlier available, e.g. earlier ready for use, and for which a calibration is available 11, 21, 61 has a higher priority than a reagent container n+1 that becomes later available, e.g. later ready for use, and/or has not yet an available calibration 21, 31 linked to it.

In particular, the methods comprise checking whether a change of active calibration/reagent container pair * is required any time that a linked calibration time period expires 10, 20, 60, 41, 51 or a new calibration becomes available 21, 61, 31 and/or when a change of status 43 of the active reagent container n occurs or an another reagent container n+1 becomes available 50 and eventually automatically changing the active calibration/reagent container pair *.

Also, the methods may further comprise automatically releasing lot calibrations 11, 21, 31 and/or container specific calibrations 61 by calculating calibration results and determining failure or passing of calibrations based on the calculated results.

Software

It is expected that one of skill in the art, notwithstanding possibly significant effort and many design choices motivated by, for example, available time, current technology, and economic considerations, when guided by the concept and principles disclosed herein will be readily capable of generating applications, software instructions and/or computer program products based upon the methods described above and illustrated by FIGS. 1-9 with minimal experimentation.

In view thereof, the methods described above may be implemented using computer programming or engineering techniques including software such as applications, computer-readable media, computer program products, firmware, hardware or any combination or subset thereof. Any such resulting application, media or computer program, having computer-readable code means, may be embodied or provided within one or more non-transitory computer-readable media, thereby making the software or computer program product (i.e., an article of manufacture).

As used herein, "software," "computer-readable media" or "computer program product" means one or more organized collections of computer data and instructions, which can be divided into two major categories, system software and application software. System software interfaces with hardware, and application software interfaces with a user. Moreover, system software includes the operating system software and firmware, as well as any middleware and drivers installed in a system. The system software provides the basic non-task-specific functions of the computer. In contrast, the application software is used to accomplish specific tasks.

Exemplary computer-readable media include, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media includes computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above also are included within the scope of computer-readable media. The article of manufacture containing the computer code may be made and/or used by executing the code directly from one medium, by copying the code from one medium to another medium, or by transmitting the code over a network.

In view thereof, the computer-readable media/computer program products can include a number of modules configured/programmed for performing the methods described herein and illustrated by FIGS. 1-9.

In some instances, non-transitory computer-readable media or computer program products are provided that include instructions for causing a processor of an electronic device, such as a handheld electronic device or a computer, to execute a method that automatically manages calibration of an in-vitro diagnostic system and performs operations associated with the method of automatically managing calibration of the in-vitro diagnostic system.

In some instances, the non-transitory computer-readable media or computer program products may further include instructions for causing the processor of then electronic device to determine a lot calibration time period 10, 20, 30 in which a lot calibration 1, 2, 3 is applicable to reagent containers n, n+1 of the same lot, having a predefined time length starting from the time when the lot calibration becomes available 11, 21, 31.

In some instances, the non-transitory computer-readable media or computer program products may further include instructions for causing the processor of then electronic device to, upon making a reagent container n, n+1 of the lot available to the in-vitro diagnostic system, determine whether a lot calibration 1, 2, 3 that has not exceeded the lot calibration time period 10, 20, 30 is available and link the reagent container n, n+1 to the available lot calibration 1, 2, 3 or most recent available lot calibration 2 if more than one lot calibration 1, 2 is available 11, 21.

In some instances, the non-transitory computer-readable media or computer program products may further include instructions for causing the processor of then electronic device to, if a new lot calibration 2, 3 for the same lot becomes available 21, 31, replace the existing link 12, 23 to the previous lot calibration 1, 2 with a link 22, 32 to the new lot calibration 2, 3.

In some instances, the non-transitory computer-readable media or computer program products may further include instructions for causing the processor of then electronic device to, determine an individual linked-container time period 41, 51 applicable to an individual reagent container n, n+1, in which a lot calibration 1, 2, 3 can be linked to the individual reagent container n, n+1, having a predefined time length starting from the time when the individual linked reagent container n, n+1 becomes available 40, 50 to the in-vitro diagnostic system, wherein replacement of the existing link 12, 23 to the previous lot calibration 1, 2 with a link 22, 32 to the new lot calibration 2, 3 is allowed only within the individual linked-container time period 41, 51 and within the lot calibration time period 10, 20.

In some instances, the non-transitory computer-readable media or computer program products may further include instructions for causing the processor of then electronic device to determine a lot calibration time limit 42, 52 until which a new lot calibration 2, 3 can be obtained or at least ordered by using an individual reagent container n, n+1 of the lot made available 40, 50 to the in-vitro diagnostic system, having a predefined length starting from the time when the individual reagent container n, n+1 becomes available 40, 50 to the in-vitro diagnostic system.

In some instances, the non-transitory computer-readable media or computer program products may further include instructions for causing the processor of then electronic device to remove or disable the link 12, 22, 23 to the lot calibration 1, 2, 3 from an individual linked reagent container n, n+1 at the latest when the individual linked-container time period 41, 51 ends and removes or disables the link to the lot calibration from any still linked reagent containers at the latest when the lot calibration time period ends.

In some instances, the non-transitory computer-readable media or computer program products may further include instructions for causing the processor of then electronic device to trigger a container-specific calibration via use of a specific reagent container n and after release of the container-specific calibration 61 to link 62 the container-specific calibration to the specific reagent container n before further use is enabled of the specific reagent container n by the in-vitro diagnostic system once the link 22 to a lot calibration 2 has been removed or disabled.

In some instances, the non-transitory computer-readable media or computer program products may further include instructions for causing the processor of then electronic device to determine a container-specific calibration time period 60, applicable to the specific reagent container n, having a predefined time length starting from the time when the container-specific calibration becomes available 61.

In some instances, the non-transitory computer-readable media or computer program products may further include instructions for causing the processor of then electronic device to determining an open-container expiration time 44 having a predefined time length starting from the time of first opening the reagent container n beyond which the individual linked-container time period 41 and the container-specific calibration time period 60 cannot extend.

In some instances, the non-transitory computer-readable media or computer program products may further include instructions for causing the processor of then electronic device to allow only one active calibration 1, 2, 3, 61 at a time and one active reagent container n, n+1 of a certain lot at time being used by the in-vitro diagnostic system, thereby determining an active calibration/reagent container pair *.

In some instances, the non-transitory computer-readable media or computer program products may further include instructions for causing the processor of then electronic device to automatically select the active calibration/reagent container pair * by activating a reagent container n, n+1 that has either an available lot calibration 1, 2, 3 or an available container-specific calibration linked 12, 22, 62, 23 to it according to a first-available time priority, where a reagent container n that becomes earlier available 40 and for which a calibration 1, 2 is available has a higher priority than a reagent container n+1 that becomes later available 50 and/or has not yet an available calibration 2, 3 linked 23, 32 to it.

In some instances, the non-transitory computer-readable media or computer program products may further include instructions for causing the processor of then electronic device to automatically check whether a change of active calibration/reagent container pair * is required any time that a linked calibration time period expires 10, 20, 60, 41, 51 or a new calibration becomes available 21, 61, 31 and/or when a change of status 43 of the active reagent container n occurs or an another reagent container n+1 becomes available 50 and eventually automatically changing the active calibration/reagent container pair *.

In some instances, the non-transitory computer-readable media or computer program products may further include instructions for causing the processor of then electronic device to change status 43 of the active reagent container n, wherein the change in status comprises any one or more of reagent container n empty or reagent level insufficient, open-container expiration time 44 reached or exceeded, reagent container n becomes unavailable because of unloading from in-vitro diagnostic system or because of user choice or other reason.

In some instances, the non-transitory computer-readable media or computer program products may further include instructions for causing the processor of then electronic device to anticipate a change of active calibration/reagent container pair * by triggering a container-specific calibration 61 before a linked calibration time period 20, 41 expires or by making a new reagent container n+1 available.

In some instances, the non-transitory computer-readable media or computer program products may further include instructions for causing the processor of then electronic device to make the new reagent container n+1 available 50 which comprises automatically opening and/or reconstituting a dry or lyophilized reagent and/or diluting a concentrated reagent in a reagent container n+1.

In some instances, the non-transitory computer-readable media or computer program products may further include instructions for causing the processor of then electronic device to automatically release lot calibrations 11, 21, 31 and/or container specific calibrations 61 by calculating calibration results and determining failure or passing of calibrations based on the calculated results.

Devices and Systems

Devices and systems are disclosed that are configured to execute the methods herein disclosed and illustrated by FIGS. 1-9, which, e.g., automatically manages calibration of an in-vitro diagnostic system and performs operations associated with the method of automatically managing calibration of the in-vitro diagnostic system.

Regardless of its intended use, the devices and systems can include one or more of the following: a housing, a display, an input/output peripheral, a memory, a processor, a power source, a user interface, a storage device, a wired and/or wireless communication means. Exemplary devices include, but are not limited to, servers, computers and laptops, portable computing devices such as mobile devices (e.g., handheld smartphones and tablets.

Figure 10:
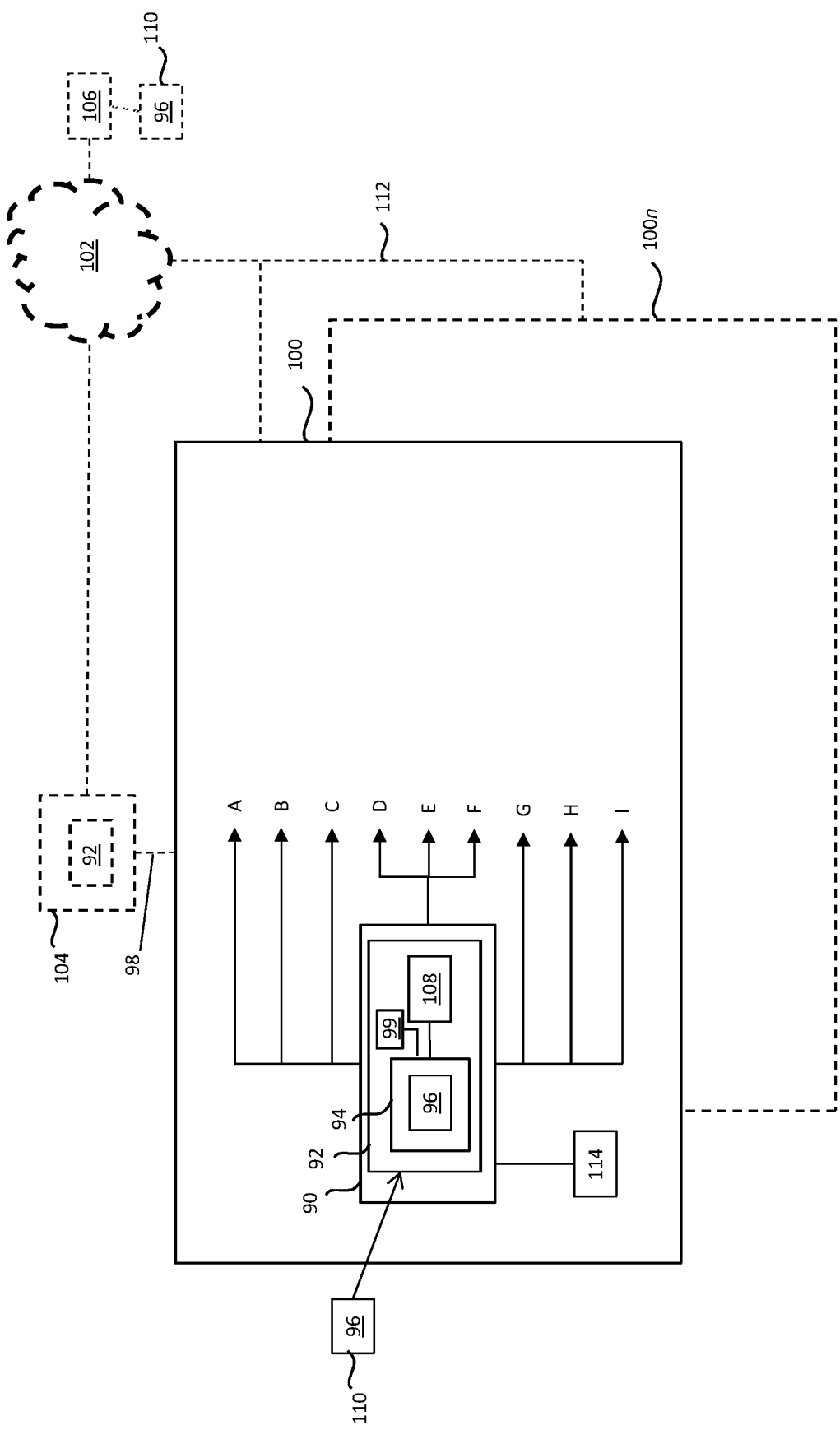
FIG. 10 schematically depicts an in-vitro diagnostic system in accordance with an embodiment of the present disclosure comprising a calibration management system associated with the method of managing calibration according to any of the FIGS. 1-9.

To illustrate, FIG. 10 depicts an in-vitro diagnostic system 100 comprising a calibration management system 90. The calibration management system 90 may comprise or be connected to a controller 92. As mentioned previously above, the term "controller" encompasses any physical or virtual processing device and in particular a programmable logic computer with a processor 94 running a computer-readable program 96 provided with instructions to perform operations associated with the method of managing calibration according to any of the disclosed embodiments. In particular, the controller 92 may be configured to execute any of the method steps according to any of the above described embodiments.

As used herein, "processor" can mean central processing units, microprocessors, microcontrollers, reduced instruction circuits (RISC), application specific integrated circuits (ASIC), logic circuits, and any other circuit or processor capable of executing the functions/methods described herein. Regardless of the type of processor, it is configured to execute one or more of the methods described herein.

The controller 92 may be integrated into the in-vitro diagnostic system 100 or be a separate logic entity in communication with the in-vitro diagnostic system via a direct connection 98, wired or wirelessly, or indirectly over a communications network 102, wired or wirelessly, such as a wide area network, e.g., the Internet or a Health Care Provider's local area network or intranet, via a network interface device 99. In some embodiments, the controller 92 might be integral with a data management unit 104, e.g., implement on a computing device such as a desktop computer, a laptop, a smartphone, a tablet, PDA, etc., may be comprised by a server computer 106 and/or be distributed/shared across/between a plurality of in-vitro diagnostic systems 100n. Moreover, the systems 100, 100n can include remote devices, servers and cloud-based elements that communicate via wires or wirelessly (e.g., infrared, cellular, Bluetooth®), where such remote devices, of controller 92 may comprise or being part of, can be, for example, a local PC/server, or a remote PC/server or a cloud-based system. The controller 92 may be also configurable to control the in-vitro diagnostic system 100, 100n in a way that workflow(s) and workflow step(s) are conducted by the in-vitro diagnostic system.

The controller 92 may communicate and/or cooperate with a scheduler and/or data manager in order to take into account incoming test orders and/or received test orders and a number of scheduled process operations associated with the execution of the test orders in order to plan when and which calibrations have to be executed and/or activated, when and which reagent containers have to be made ready for use, and/or which active calibration/reagent container pair is to be selected.

The controller 92 may be further configured to prevent queueing up samples, for which a test order has been received but processing has not yet started, from entering the in-vitro diagnostic system and/or from starting a sample test workflow until an active calibration/reagent container pair is not activated. In this way, delay of routine operation due to missing calibration can be reduced and efficiency of operation can be increased.

As mentioned above, the controller 92, via the processor 94, is running a computer-readable program 96 that is provided/coded with instructions to perform operations associated with the method of managing calibration according to any of the methods A-I of FIG. 1-9. The computer-readable program 96 may be provided pre-loaded in memory 108 of the controller 90 or provided on a computer-readable media or computer program product 110, which instructions, reflecting related ones of the above disclosed operational steps of the methods of FIGS. 1-9, are therein read and executed by processor 94.

It is to be appreciated that each system 90, 100, 100n can further include multiple workstations and application servers containing one or more applications that can be located at geographically diverse locations. In some embodiments, each system 90, 100, 100n is implemented using a communication path 112 provided via a wide area network (WAN) or network 102, such as an intranet or the Internet, or other wired or wireless communication network, e.g., that may include a cloud computing-based network configuration (for example, "the cloud"). Generally, the lines depicted in FIG. 10 indicate communication rather than physical connections between the various components. The communication path 112 may be formed from any medium that is capable of transmitting a signal such as, for example, conductive wires, conductive traces, optical waveguides, or the like, or from a combination of mediums capable of transmitting signals. The communication path 112 communicatively couples the various components of the system 100, 100n. As used herein, the term "communicatively coupled" means that coupled components are capable of exchanging data signals with one another such as, for example, electrical signals via conductive medium, electromagnetic signals via air, optical signals via optical waveguides, and the like.

Each system 90, 100, 100n and/or controller 92 can include the processor 94. The processor 94 can be one or more processors capable of executing machine readable instructions. Accordingly, each processor 94 can be communicatively coupled to the other components of the system 90, 100, 100n by the communication path 112. Accordingly, the communication path 112 may communicatively couple any number of processors with one another, and allow the modules coupled to the communication path 112 to operate in a distributed computing environment. Specifically, each of the modules can operate as a node that may send and/or receive data. Each processor 94 may process the input signals received from the system modules and/or extract information from such signals.

Each system 90, 100, 100n and/or controller 92 can include the memory 108, which is communicatively coupled to the processor 94. Memory 108 may be a non-transitory computer readable medium or non-transitory computer readable memory and may be configured as a nonvolatile computer readable medium. The memory 108 may comprise RAM, ROM, flash memories, hard drives, or any device capable of storing machine readable instructions such that the machine readable instructions of the program 96 can be accessed and executed by each processor 94. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 108 or media 110. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In various embodiments, each system 90, 100, 100n, may include the one or more processors 94 communicatively coupled to the memory 108 that stores the instructions of the program 96 that, when executed by each processor 94, cause the processor to perform one or more functions as described herein. Also, the memory 108 may be used for electronically saving and updating a calibration library comprising the calibration results as they become available, where linking a reagent container to a calibration refers to the process of creating a virtual link between the reagent container and a calibration result in such a calibration library and at such location in the memory 108.

Still referring to FIG. 10, each system 90, 100, 100n can comprise a display 114 for providing visual output such as, for example, information, graphical reports, messages, or a combination thereof. The display 114 may also be provided on a remote computing device, such as device 106, 426, which may be communicatively coupled to devices across platforms, such as mobile smart devices including smartphones, tablets, laptops, and/or the like or medical devices being hand-held or bench-top, and the like, which also may provide display 114. The display 114 on the screen of such a computing device(s) can be coupled to the communication path 112 and communicatively coupled to the one or more processors 94 for remote displaying. The display 114 can include any medium capable of transmitting an optical output such as, for example, a cathode ray tube, light emitting diodes, a liquid crystal display, touch screens, a plasma display, or the like.

Each system 90, 100, 100n can include the network interface device 99 for communicatively coupling the processor 94 with a computer network such as network 102. The network interface device 99 is coupled to the communication path 112 such that the communication path communicatively couples the network interface device 99 to other modules of the system 100n as well as server 106. The network interface device 99 can be any hardware device capable of transmitting and/or receiving data via a wired or wireless network. Accordingly, the network interface device 99 can include a communication transceiver for sending and/or receiving data according to any wired or wireless communication standard. For example, the network interface device 99 can include a chipset (e.g., antenna, processors, machine readable instructions, etc.) to communicate over wired and/or wireless computer networks such as, for example, wireless fidelity (Wi-Fi), WiMax, BLUETOOTH®, IrDA, Wireless USB, Z-Wave, ZigBee, or the like.

Still referring to FIG. 10, data from various applications running on computing devices such as devices 90, 92, 106 can be provided from such devices to other system 100n and vice-versa, via the network interface device 99. Each computing device 90, 92, 106 can be any device having hardware (e.g., chipsets, processors, memory, etc.) for communicatively coupling with the network interface device 99 and a network 102.

The network 102 can include any wired and/or wireless network such as, for example, wide area networks, metropolitan area networks, the Internet, an Intranet, the cloud, satellite networks, or the like. Accordingly, the network 102 can be utilized as a wired and/or wireless access point by devices 90, 92, 106 to access each other or any other component in system 100n or servers connected to the network 102. Each server, e.g., service 106, as well as data manager unit 104 and any additional servers generally include processors, memory, and chipset for delivering resources, e.g., via the network 102. Resources can include providing, for example, processing, storage, software, and information from the data manager unit 104 and/or server 106 to the system 100, 100n via the network 102.

It can be thus understood that the disclosed computer-implemented methods of automatically managing calibration of an in-vitro diagnostic system and the disclosed in-vitro diagnostic system enable not only to minimize user intervention, to minimize the number of calibration procedures and the time spent for calibration procedures, to minimize delays of routine operation due to missing or expired calibration, but also and especially to enable optimal use of reagents, therefore saving also costs and preventing waste of often expensive materials.

What is claimed is:

1. A method of automatically managing calibration of an in-vitro diagnostic system, the method comprising:
determining, by the in-vitro diagnostic system, a lot calibration time period in which a lot calibration is applicable to reagent containers of the same lot, having a predefined time length starting from the time when the lot calibration becomes available;
upon making a reagent container of the lot available to the in-vitro diagnostic system, determining, by the in-vitro diagnostic system, whether at least one lot calibration that has not exceeded the lot calibration time period is available and linking the reagent container to a most recent available lot calibration of the at least one lot calibration, wherein each different lot calibration of a plurality of lot calibrations used by the in-vitro diagnostic system is associated with a different calibration result file that is stored at a respective memory location in a memory of the in-vitro diagnostic system, and wherein linking the reagent container to the most recent available lot calibration comprises creating a dynamic virtual link between the reagent container and the respective memory location for the calibration result file of the most recent available lot calibration;
determining, by the in-vitro diagnostic system, an individual linked-container time period corresponding to the reagent container linked to the most recent available lot calibration, wherein the individual linked-container time period is different from the lot calibration time period, has a predefined time length starting from a time when the reagent container becomes available to the in-vitro diagnostic system, and runs at least partially concurrently with the lot calibration time period;

linking, by the in-vitro diagnostic system, one or more other reagent containers of the same lot to the most recent available lot calibration by creating one or more respective dynamic virtual links between each of the one or more other reagent containers of the same lot and the respective memory location for the calibration result file of the most recent available lot calibration for the same lot;

determining, by the in-vitro diagnostic system and subsequent to linking the reagent container to a most recent available lot calibration, that a new lot calibration is available for the reagent containers of the same lot;

determining, by the in-vitro diagnostic system and in response to a determination that the new lot calibration is available, whether the individual linked-container time period of the reagent container and the lot calibration time period have expired; and replacing, by the in-vitro diagnostic system and in response to determining that the individual linked-container time period of the reagent container and the lot calibration time period have not expired, the dynamic virtual link between the reagent container and the respective memory location for the calibration result file of the most recent available lot calibration with a new dynamic virtual link between the reagent container and the respective memory location for the calibration result file of the new lot calibration for the same lot.

2. The method of claim 1, further comprising removing or disabling, by the in-vitro diagnostic system and in response to determining that individual linked-container time period has expired, the dynamic virtual link between the reagent container and the respective memory location for the calibration result file of the most recent available lot calibration.

3. The method of claim 2, further comprising triggering, by the in-vitro diagnostic system, a container-specific calibration using a specific reagent container, and after release of the container-specific calibration, linking, by the in-vitro diagnostic system, the container-specific calibration to the specific reagent container before enabling further use of the specific reagent container by the in-vitro diagnostic system once the dynamic virtual link to the lot calibration has been removed or disabled.

4. The method of claim 3, further comprising determining, by the in-vitro diagnostic system, a container-specific calibration time period, applicable to the specific reagent container, having a predefined time length starting from the time when the container-specific calibration becomes available.

5. The method of claim 1, further comprising determining, by the in-vitro diagnostic system, an open-container expiration time having a predefined time length starting from the time of first opening the reagent container beyond which the individual linked-container time period and a container-specific calibration time period cannot extend.

6. The method of claim 1, further comprising allowing, by the in-vitro diagnostic system, only one active calibration at a time and one active reagent container of a certain lot at a time being used by the in-vitro diagnostic system, thereby determining an active calibration/reagent container pair.

7. The method of claim 6, further comprising automatically selecting, by the in-vitro diagnostic system, the active calibration/reagent container pair by activating a reagent container that has either an available lot calibration or an available container-specific calibration linked to it according to a first-available time priority, where a reagent container that becomes earlier available and for which a calibration is available has a higher priority than a reagent container that becomes later available and/or has not yet an available calibration linked to it.

8. The method of claim 7, further comprising automatically checking, by the in-vitro diagnostic system, whether a change of active calibration/reagent container pair is required any time that a linked calibration time period expires or a new calibration becomes available and/or when a change of status of the active reagent container occurs or an another reagent container becomes available and eventually automatically changing the active calibration / reagent container pair.

9. The method of claim 8, wherein the change of status of the active reagent container comprises any one or more of reagent container empty or reagent level insufficient, open-container expiration time reached or exceeded, or reagent container becomes unavailable because of unloading from in-vitro diagnostic system.

10. The method of claim 8, further comprising triggering, by the in-vitro diagnostic system, a container-specific calibration before a linked calibration time period expires.

11. The method of claim 8, further comprising making, by the in-vitro diagnostic system, a new reagent container available by automatically opening and/or reconstituting a dry or lyophilized reagent and/or diluting a concentrated reagent in a reagent container.

12. The method of claim 1, further comprising automatically releasing, by the in-vitro diagnostic system, lot calibrations and/or container specific calibrations by calculating calibration results and determining failure or passing of calibrations based on the calculated results.

13. The method of claim 11, further comprising triggering, by the in-vitro diagnostic system, a container-specific calibration in response to making the new reagent container available.

14. The method of claim 2, further comprising removing or disabling, by the in-vitro diagnostic system, the one or more respective dynamic virtual links between each of the one or more other reagent containers of the same lot and the respective memory location for the calibration result file of the most recent available lot calibration for the same lot.

15. The method of claim 14, wherein removing or disabling the one or more respective dynamic virtual links between each of the one or more other reagent containers and the respective memory location for the calibration result file of the most recent available lot calibration for the same lot comprises removing or disabling the one or more respective dynamic virtual links in response to determining that the lot calibration time period has expired.

16. The method of claim 1, wherein replacing the dynamic virtual link with the new dynamic virtual link comprises replacing the dynamic virtual link with the new dynamic virtual link without modifying the calibration result file of the most recent available lot calibration.

* * * * *